United States Patent
Gibbs et al.

(10) Patent No.: US 7,191,162 B2
(45) Date of Patent: Mar. 13, 2007

(54) FIFO INTERFACE FOR FLAG-INITIATED DMA FRAME SYNCHRO-BURST OPERATION

(75) Inventors: Clayton Gibbs, McKinney, TX (US); Kyle Castille, Houston, TX (US); Natarajan Kurian Seshan, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 153 days.

(21) Appl. No.: 10/690,119

(22) Filed: Oct. 21, 2003

(65) Prior Publication Data

US 2005/0086400 A1 Apr. 21, 2005

(51) Int. Cl.
- G06E 1/00 (2006.01)
- G06F 3/00 (2006.01)
- G06F 13/28 (2006.01)
- G06F 13/00 (2006.01)
- G06F 5/00 (2006.01)

(52) U.S. Cl. .............................. 706/16; 710/1; 710/22; 710/33; 710/35; 710/52; 710/57

(58) Field of Classification Search ................ 710/22, 710/28, 31, 35, 55, 57, 200; 711/145, 163
See application file for complete search history.

(56) References Cited

U.S. PATENT DOCUMENTS

| | | | |
|---|---|---|---|
| 4,769,769 A * | 9/1988 | Bolt et al. ..................... 710/57 |
| 4,910,656 A * | 3/1990 | Scales et al. ................ 711/144 |
| 6,545,942 B2 * | 4/2003 | Uchida et al. .............. 365/233 |
| 6,904,473 B1 * | 6/2005 | Bloxham et al. ............. 710/22 |
| 2003/0172206 A1 * | 9/2003 | Secatch ........................ 710/52 |
| 2004/0010637 A1 * | 1/2004 | Johnson ........................ 710/35 |

OTHER PUBLICATIONS

Khatib, Jamil; FIFO, First-In First-Out Memory; Mar. 28, 1999; http://web.archive.org/web/20000306094145/http://www.geocities.com/SiliconValley/Pines/6639/ip/fifo.html; pp. 4-6.*

Peter Spasov; Microcontroller Technology: The 68HC11; 2002; Prentice Hall; 4th Edition; pp. 252-253.*

* cited by examiner

*Primary Examiner*—Fritz Fleming
*Assistant Examiner*—Richard Franklin
(74) *Attorney, Agent, or Firm*—Robert D. Marshall, Jr.; W. James Brady; Frederick J. Telecky, Jr.

(57) ABSTRACT

The invention describes a modification of FIFO hardware to allow improved use of FIFOs for burst reading from or writing to a processor direct memory access unit via either an expansion bus or an external memory interface using FIFO flag initiated bursts. The hardware and FIFO signal modifications make the FIFO-DMA interface immune to deadlock conditions and generation of spurious interrupt events in the process of initiating burst transfers. The FIFO function is modified to synchronize the frame transfer on the digital signal processor even if the digital signal processor lacks this functionality. By delaying the programmable flag assertions within the FIFO until after the current burst is complete the DSP-FIFO interface may be made immune to deadlock conditions and generation of spurious events.

10 Claims, 5 Drawing Sheets

FIFO INTERFACE FOR FLAG-INITIATED DMA FRAME SYNCHRO-BURST OPERATION

TECHNICAL FIELD OF THE INVENTION

The technical field of this invention is control of data transfers in a digital signal processor.

BACKGROUND OF THE INVENTION

Digital signal processors (DSP) are often connected to external FIFO memory at an expansion bus interface or external memory interface. The expansion bus interface uses direct memory access (DMA) to link the digital signal processor core and its peripheral devices to the expansion bus. Synchronous first-in-first-out (FIFO) devices with deep pipelines enable burst transfer of large amounts of data in the form of frames in rapid succession over many clock cycles. The term synchronous FIFO implies that the FIFO read or write accesses are synchronous to the read or write clock, respectively. Clocks are both locked in time to the system clock. The term synchronization event refers to an event, generated by the FIFO which causes the DSP/DMA controller to read (or write) a given or known amount of data. For this discussion, the synchronization event is closely related to the activation of a FIFO status flags. These FIFO status flags may include Almost Empty (PAE), Almost Full (PAF), Half Full (HF). These operations can be carried out only with full synchronism between the DSP and the FIFO.

FIG. 1 illustrates a pair of conventional synchronous FIFOs 101 and 102 connected to the expansion bus 100 of a conventional DSP. FIFO 101 permits the expansion bus to read in external data. FIFO 102 permits the expansion bus to write data out to external devices. The expansion bus 100 is normally only one of many peripheral interface devices connected to the direct memory access (DMA) within the DSP via a DMA control bus and a DNA data bus. The expansion bus clock XPCLK 103 is derived from DSP system clock and drives both the read clock of FIFO 101 and the write clock of FIFO 102. Data flows to the expansion bus port XD(N:0) 117 from FIFO 101 Q(N:0) output 105 via I/O path 104. Data flows to the D(N:0) input 106 of FIFO 102 from expansion bus port XD(N:0) 117 via I/O path 104. FIFO flags $\overline{PAE}$ 111 (almost empty flag) and $\overline{PAF}$ 112 (almost full flag) are two of the possible flags that may be used to signal the INTx 109 and INTy 110 expansion bus inputs is possible. Expansion bus enable signals 107 (XCEx, $\overline{XOE}$, $\overline{XOE}$ and $\overline{XOE}$) drive the enable logic 108 configured to control the FIFO enables as required. FIFO 101 inputs data on D(N:0) input 115 as timed by write clock 113. FIFO 102 output data on Q(N:0) output 116 as timed by read clock 114.

FIFOs 101 and 102 are typically used in one of three modes. In the first mode, the system reads from or writes to the FIFO at a fixed rate without regard for the FIFO flags. The inbound and outbound rates from a given FIFO are matched such that overflow or underflow does not normally occur. In the event that an overflow or underflow does occur there is generally a recovery mechanism provided by the system. In some cases there is no need for recovery mechanism because data loss is acceptable. In the second mode, the system is tightly coupled to the FIFO and is able to halt accesses to the FIFO based on the status of the empty flag for a read or the full flag for a write. In the third mode, a system is loosely coupled to the FIFO and performs a burst transfer based on the status of one of the intermediate flags. Among these flags are half full, almost full, or almost empty. The almost full and almost empty flags are typically user defined by the value stored in an offset register in programmable FIFOs. The length of the burst will typically match the offset defined by the given flag. This burst transfer mode of operation of mode 3 is of prime interest here.

Flag Triggered Burst Synchronization in DSPS Without Synchronization Control

Consider the case of a digital signal processor with read bursts triggered when the half full flag HF switches to an active high state. When the HF flag switches from low to high, the digital signal processor initiates a read burst from the FIFO of length HF, which is half the FIFO depth. In digital signal processors without frame synchronization control, having synchronization events triggered from programmable FIFO flags such as HF is likely to produce problematical conditions. There are two separate problem conditions for a read burst. A similar analysis shows that the counterpart of these two scenarios can occur for write bursts to the FIFO.

The first problem occurs as follows. Assume the FIFO is 1024 words deep and the HF Flag is set to become active at 512 words occupancy. Assume further that bursts are set to occur in 512 word increments. This means that a burst read by the digital signal processor from the FIFO is initiated when the FIFO HF Flag transitions to the active state and signals that the FIFO contains 512 or more words. In general, the read and write side for the FIFO do not have to both operate in the same use model as defined above. It will be typical for the digital signal processor side of the FIFO to operate in mode 3, while the other side operates in mode 1 or 2. A write burst into the FIFO from an external source is initiated when the HF Flag transitions to the inactive state signaling that the FIFO contains less than 512 words. If the write operation proceeds faster than the read operation, it is possible to have two sequential write bursts without having a full read burst between them. Without the full read burst in between these two write bursts, the FIFO then gets locked into a state where more than 512 words are stored and no read burst request initiated from the HF Flag can occur.

The second problem occurs as follows. Assume the FIFO is 1024 words deep and the HF Flag is inactive initially with the FIFO storing one less than 512 words occupancy. Assume again that bursts are set to occur in 512 word increments. In this scenario a burst read by the digital signal processor from the FIFO is initiated when the FIFO HF Flag transitions to the active state and signals that the FIFO contains 512 or more words. It also means that a write burst into the FIFO from an external source is initiated when the HF Flag transitions to the inactive state signaling that the FIFO contains less than 512 words. Combinations of alternating single word writes with single word reads can cause spurious events to be generated. This means that a succession of two burst reads by the DSP from the FIFO can be initiated without an intervening write burst and an underflow results.

These two scenarios indicate that triggering a synchronization event in the digital signal processor from a FIFO flag such as half full flag HF is subject to possible malfunction. In general the risk is incurred when bursts are interrupted before completion. Thus if the read burst is interleaved in time with a write burst in process, or conversely if the write burst is interleaved in time with a read burst in process, problems can arise. The normal practice to avoid this is to force the direct memory access unit to ignore events requesting service during a current frame transfer. For example, for a typical data transfer the beginning of which was synchronized by detecting an active. almost full flag $\overline{PAF}$ 112 during a DSP burst read from a FIFO, the FIFO resets the $\overline{PAF}$ flag 112 to the inactive high state after the first piece of data was read. If the $\overline{PAF}$ flag 112 were to stay inactive during the burst, this would indicate that the data source is permitted to write additional data to the FIFO before the direct memory access unit completes reading the burst frame.

In an example of a direct memory access unit controlled solution, after a frame is completed, the direct memory access unit waits an additional n-clock cycles before checking to determine if the flag is still active. This is merely to account for any synchronization delays within the FIFO between when an access occurs and when the flag is updated. If it is still active, the next frame will be synchronized based on the fact that the flag is still active. This delay is needed to give the external FIFO time to update its flags and give the $\overline{PAF}$ flag 112 time to propagate through the internal registers before being registered inside the direct memory access unit. For example, a FIFO typically takes approximately one to three FIFO clock cycles to update its $\overline{PAF}$ flag 112 externally.

In addition, the direct memory access unit must mask spurious transitions on the flag input while the transfer is in progress, and wait n-additional cycles before reevaluating the flag. The difficulties relating to generation of spurious transitions on the flag output is one that relates equally to the use of any of the available flags in a conventional FIFO.

FIG. 2 illustrates the timing relationships between a flag input to the digital signal processor, the generation of a direct memory access synchronization event, and the direct memory access frame. The EXT_INT1 signal 201 is triggered, for example, by almost full signal $\overline{PAF}$ 112 or almost empty $\overline{PAE}$ signal 111 from a FIFO. (see 111 and 112 of FIG. 1). Further recognition of interrupts generating a DMA_Synch_Event signal 202 are ignored until the DMA-_Frame 203 completes at time 205.

The transition of Flag_Input_to_EXT_INT1 signal 201 from high to low while a burst is not in progress triggers direct memory access synchronizing event 202.

The negative edge of Flag_Input_to_EXT_INT1 signal 201 triggers a frame transfer on signal DMA_Frame 203. This gates off DMA_Synch_Event signal at time 202. During the synchronization event, the transition on Flag_Input-_to_EXT_INT1 signal 201 at time 204 is ignored.

After a read burst completes internally at time 205, a delay of n-clock cycles 211 is inserted before another DAM_Synch_Event signal at time 206 checks whether Flag_Input_to_EXT_INT1 signal 201 is active at time 207.

Because Flag_Input_to_EXT_INT1 signal 201 is still active at time 207 after the burst and delay, the new DMA_Synch_Event at time 206 is registered inside the direct memory access unit.

The new direct memory access synchronization event triggers another DMA_Frame burst at time 208.

FIG. 3 illustrates a conventional FIFO device used in pairs (as in FIG. 1) for data transfer to and from the digital signal processor via the expansion bus. The FIFO includes RAM array 300 configured to accept data from WData input 301 via input register 302 and pass data to output register 303 and read output port 304. Synchronous read control logic 306 and write control logic 307 accept respective read clock 309 and write clock 310 from a common source at the expansion bus XFCLK clock output (103 in FIG. 1). Read pointer 313 and write pointer 314 collectively track the respective placements of read and write data handled by the FIFO. The pointers provide information for generation of flags and status in the status flag logic 316. A number of possible flags can be generated, such as: almost empty $\overline{PAE}$ flag 111; almost full $\overline{PAF}$ flag 112; and half full HF flag 118/119.

SUMMARY OF THE INVENTION

The invention is a modification of conventional FIFO hardware to allow improved use of FIFOs for burst reading from or writing to a processor direct memory access unit via either an expansion bus or an external memory interface using FIFO flag initiated bursts. The hardware and FIFO signal modifications described make the FIFO-DMA interface are immune to deadlock conditions and generation of spurious interrupt events in the process of initiating burst transfers. The FIFO function is modified to provide the digital signal processor a means for synchronized frame transfer functionality even if it is not implemented by the digital signal processor. By delaying the programmable flag assertions within the FIFO until after the current burst is complete the DSP-FIFO interface may be made immune to deadlock conditions and generation of spurious events.

BRIEF DESCRIPTION OF THE DRAWINGS

These and other aspects of this invention are illustrated in the drawings, in which.

DETAILED DESCRIPTION OF PREFERRED EMBODIMENTS

Figure 4:
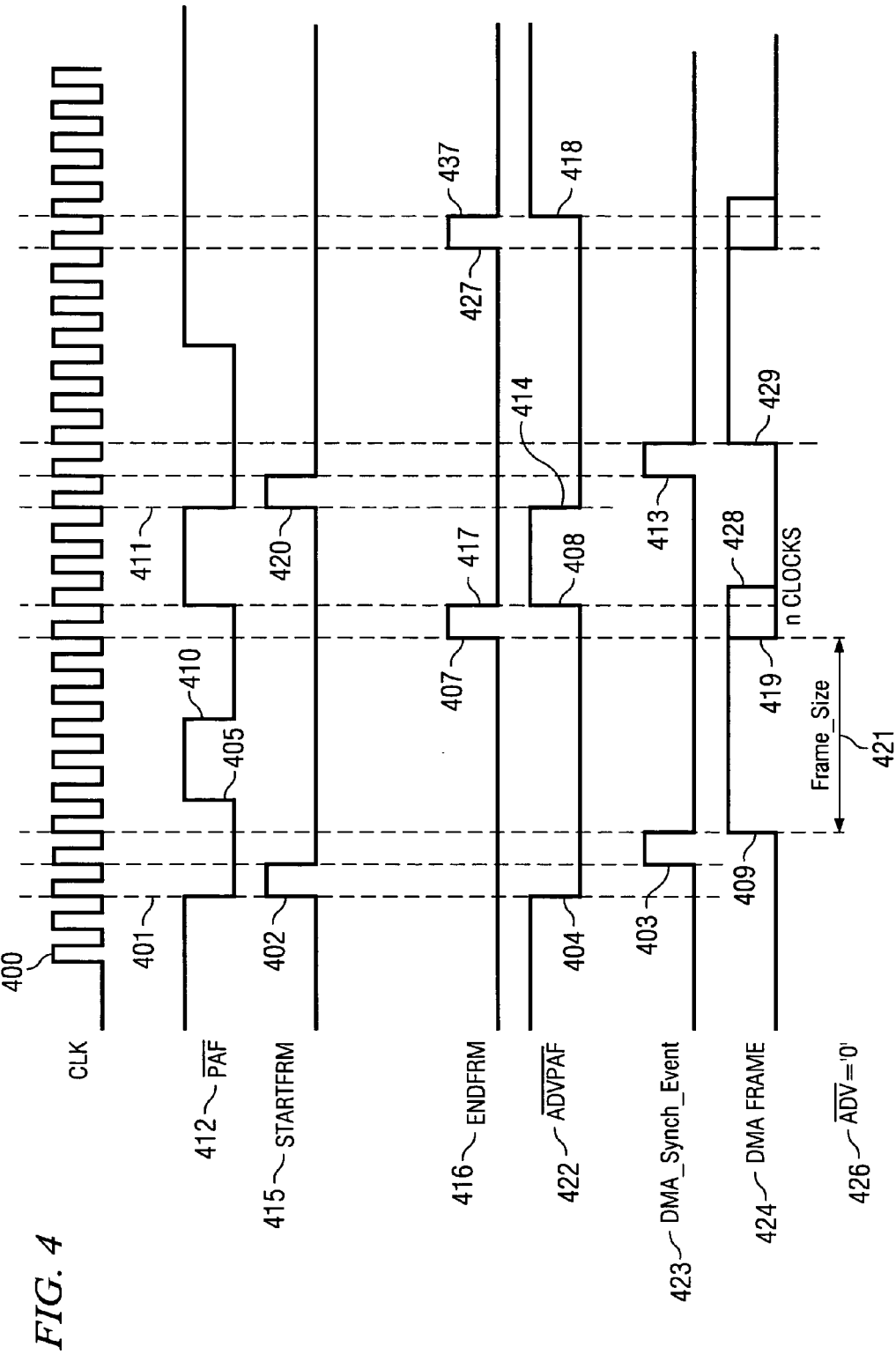
FIG. 4 illustrates the timing signals required to improve the immunity to deadlock conditions and generation of spurious events in a FIFO configured for synchronized burst mode.

The FIFO device described in this invention has modified timing logic within the status flag logic block and modified burst control signal behavior. In this manner the FIFO-DSP interface is made immune to deadlock conditions and generation of spurious interrupt events in FIFO flag initiated bursts. FIG. 4 illustrates the waveforms of the synchronized burst mode implemented in the FIFO of this invention. With the modifications described a synchronous FIFO can interface properly with the digital signal processor in flag-initiated frame transfer functionality even if the digital signal processor does not already have a synchronous interface.

While FIG. 4 illustrates the concept of the invention for modification of the almost full flag $\overline{PAF}$ 412 to be supplanted by the advanced almost full flag $\overline{\text{ADVPAF}}$ 422, the principles are easily extended to modify the operation of almost empty flag $\overline{\text{PAE}}$ 111 (FIG. 1) to become the advanced almost empty flag $\overline{\text{ADVPAE}}$ (not shown in FIG. 4) or the half full flag $\overline{\text{HF}}$ (118 and 119 of FIG. 1) to become the advanced half full flag $\overline{\text{ADVHF}}$ (not shown in FIG. 4). Further extension to empty flags and full flags also is straightforward. Under normal non-burst FIFO operations, the $\overline{\text{PAF}}$ almost full flag (pin 112 of FIG. 1) functions as it would in the many conventional FIFO devices. That is, the $\overline{\text{PAF}}$ flag 112 is synchronized to WCLK or RCLK, (represented by CLK 400 in FIG. 4) if the $\overline{\text{PAF}}$ flag 112 is programmed as synchronous.

Figure 3:
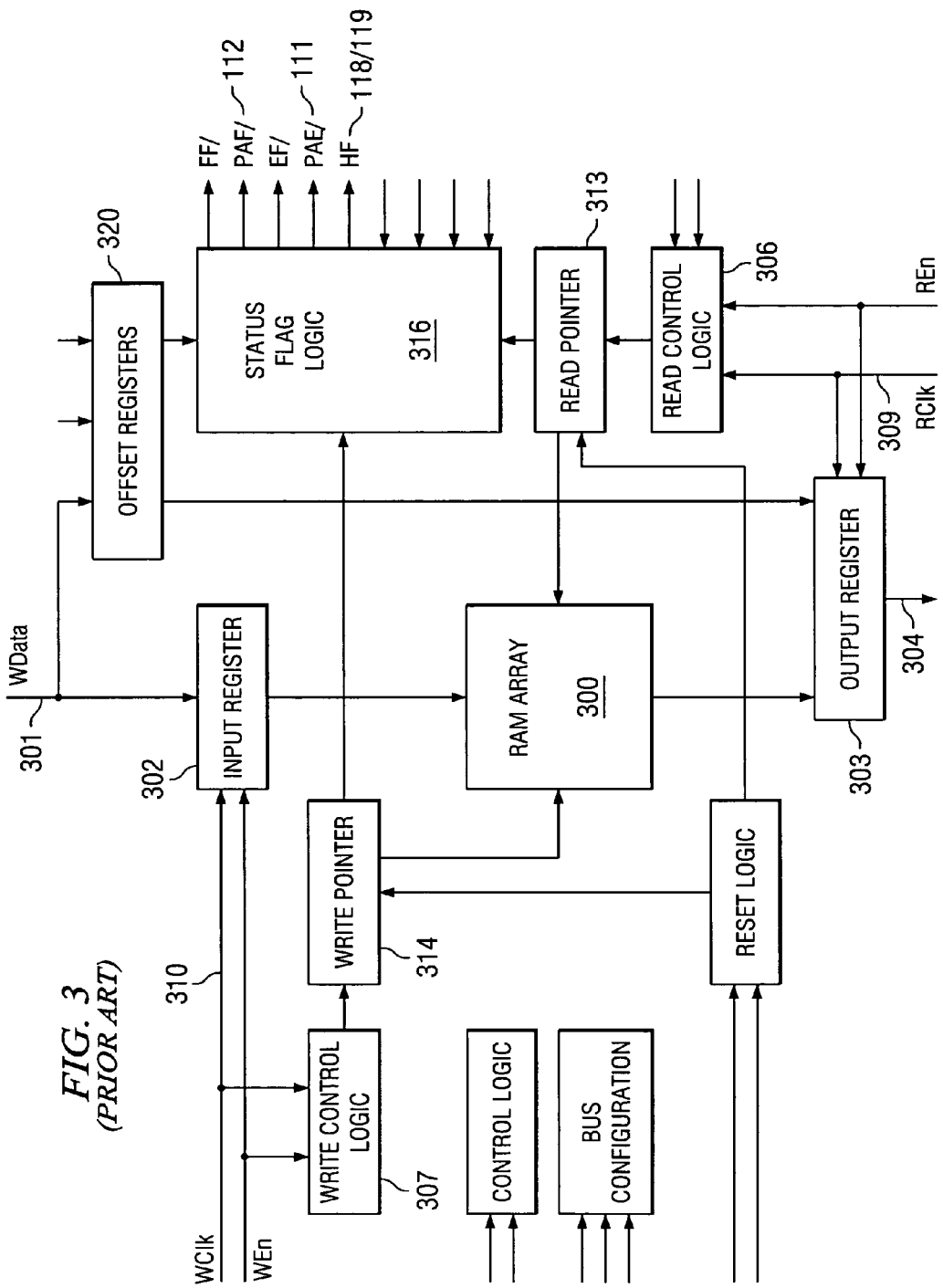
FIG. 3 illustrates the block diagram of a conventional synchronous FIFO used in pairs to interface to a digital signal processor at an expansion bus interface (Prior Art)

If the $\overline{\text{ADV}}$ pin 426 (FIGS. 4 and 5) is a static signal asserted active low as noted in FIG. 4, the signal $\overline{\text{PAF}}$ 412 operation will be supplanted as seen in the $\overline{\text{ADVPAF}}$ waveform 422 illustrated in FIG. 4. The frame size value Frame_Size 421 may reside in a status register in the digital signal processor and ENDFRM 416 (both FIGS. 4 and 5) is provided by the digital signal processor to end the burst. Alternatively, the Frame_Size 421 can be provided to the FIFO during a reset either serially or in parallel through WData port 301 (FIG. 3), much like the programmable flag offset values are programmed during a reset. If the Frame_Size 421 is programmed into the FIFO during reset, the FIFO will generate internally both a signal STARTFRM 415 and a signal ENDFRM 416. $\overline{\text{ADVPAF}}$ 422 will be synchronized to one of the clocks, either WCLK or RCLK, depending on the programmable flag timing mode. The sequence of events for a burst mode cycle is illustrated in FIG. 4 as follows.

For Advanced Mode $\overline{\text{ADV}}$=0

Once the $\overline{\text{ADV}}$ pin 426 is set low (advanced mode), both $\overline{\text{ADVPAF}}$ 422 and $\overline{\text{PAF}}$ 412 go low at the same time 401, as $\overline{\text{PAF}}$ 412 would have gone low in the non-advanced mode (when $\overline{\text{ADV}}$=1). STARTFRM 415 is generated at 402. When $\overline{\text{ADVPAF}}$ 422 goes low at time 404 it triggers a DMA_Synch_Event 403 in the digital signal processor and the signal DMA_Frame 424 internal to the FIFO is asserted high at time 409. After the DMA Frame is completed as indicated by pulse 407 in ENDFRM 416, the $\overline{\text{ADVPAF}}$ pin 422 returns high at time 408 on the positive edge of the clock co-incident with the trailing edge of ENDFRM 416 at time 417. Note that during the DMA Frame interval 421 $\overline{\text{PAF}}$ 412 toggles once at times 405, 410, but there is no response in the $\overline{\text{ADVPAF}}$ signal 422 since the DMA_Frame 424 is still active during interval defined by 421.

The end of DMA_Frame signal 424 occurs at the rising edge of ENDFRM 416 at time 407. In one embodiment of the invention ENDFRM 416 is added as an additional FIFO pin that can receive a pulse from the digital signal processor signaling the end of the frame burst. In the alternate embodiment the generation of ENDFRM 416 is handled by the FIFO (no ENDFRM pin) and the pulse 427 in ENDFRM 416 will be internal to the FIFO. This causes the DMA_Frame signal 424 in the FIFO to be de-asserted at time 419. After the completion of DMA_Frame signal 424, n-clocks 428 are appended to the DMA_Frame cycle during which time no new cycles may begin.

On a later rising edge 411 of the clock 400, STARTFRM 415 is once again generated at time 420. $\overline{\text{ADVPAF}}$ 422 and $\overline{\text{PAF}}$ 412 are again asserted low since the $\overline{\text{ADV}}$ 426 is low. This causes another DMA_Frame signal 424 to become active. When $\overline{\text{ADVPAF}}$ 422 goes low at time 414 it triggers a DMA_Synch_Event 423 in the digital signal processor at time 413 and the DMA_Frame signal 424 internal to the FIFO is asserted high at time 429. After DMA_Frame signal 424 completes, the $\overline{\text{ADVPAF}}$ pin 422 returns high at time 418 on the positive edge of the clock co-incident with the trailing edge of ENDFRM 416 at time 437.

The frame size and word counting can be handled one of two ways. First, the digital signal processor can handle frame size and word count using a status register. At the end of the direct memory access frame and the subsequent n-CPU clocks required by the digital signal processor, the digital signal processor could assert a pulse on the ENDFRM 416 of the FIFO signaling the end of a direct memory access frame in the FIFO. Second, the frame size plus the associated n-CPU clock equivalents could be passed either serially or parallel to the FIFO during reset. The default frame size value is preferably four words. The frame size is stored in a register in the FIFO and placed in a counter at the beginning of a direct memory access frame event. Once the counter decrements to 0 and becomes empty it would signal the end of the direct memory access frame and allow the $\overline{\text{ADVPAF}}$ pin 422 to be asserted if the other conditions are correct.

Figure 1:
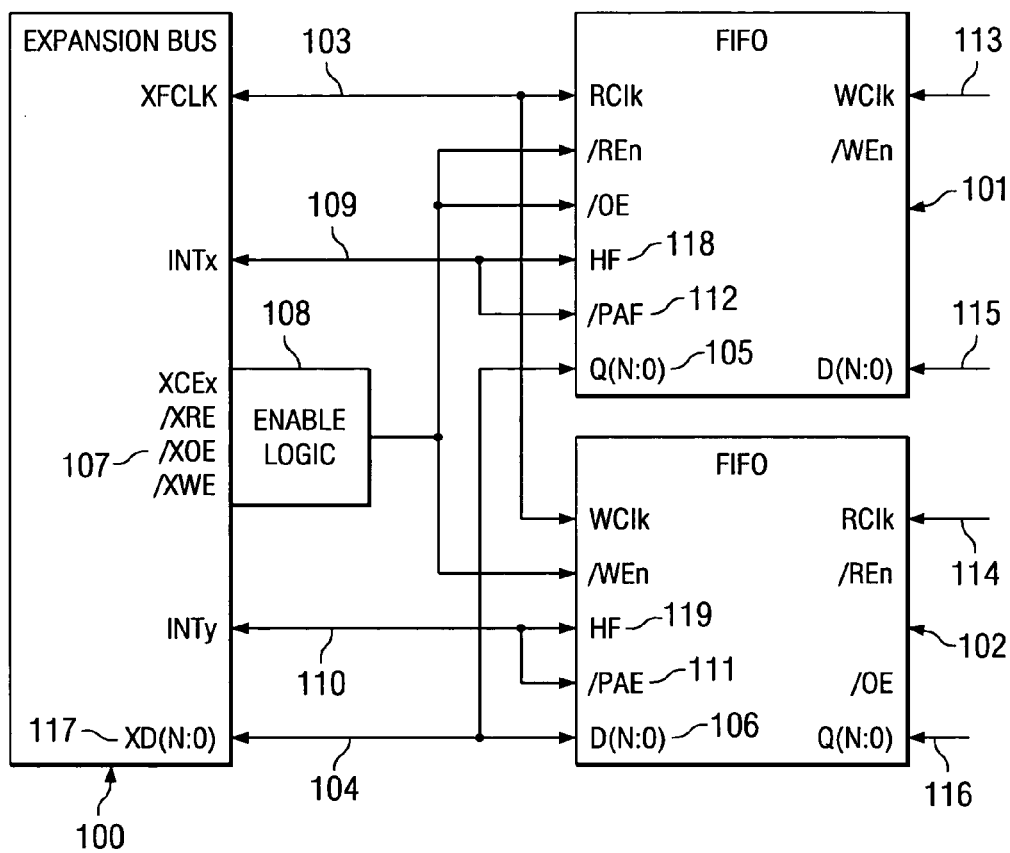
FIG. 1 illustrates the conventional connection of a pair of external synchronous FIFOs to a digital signal processor via the external bus interface for the purpose of executing read and write operations between the external bus interface and external FIFO devices.
Figure 2:
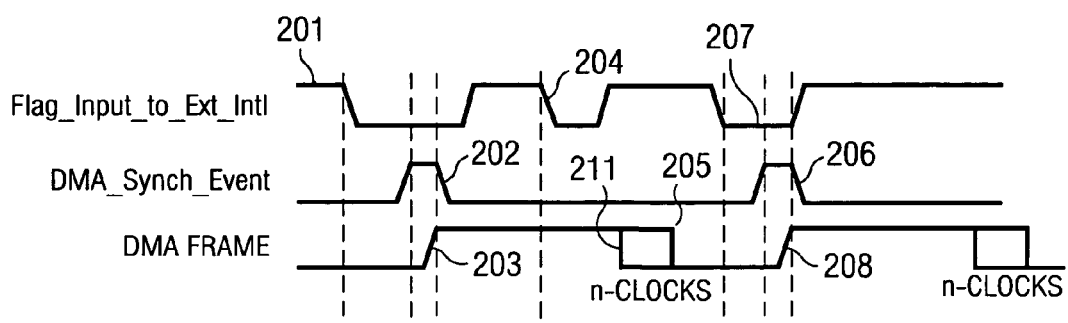
FIG. 2 illustrates the external interrupt signal timing and direct memory access synchonization events for initiation of direct memory access read burst frames from FIFO flags (Prior Art)
Figure 5:
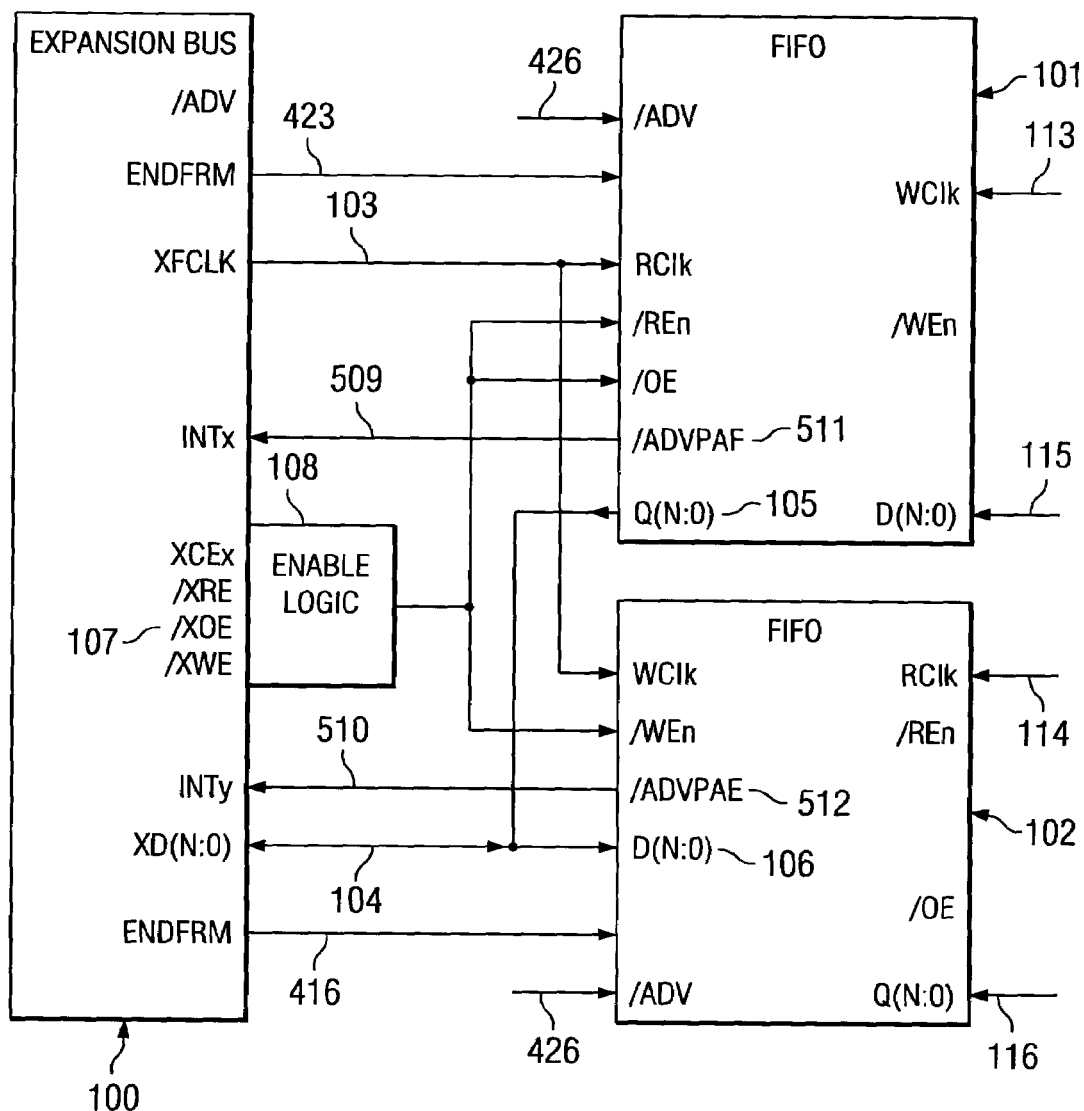
FIG. 5 illustrates the modified connection of an external FIFO to a direct memory access unit providing immunity to deadlock conditions and generation of spurious events according to the technique of this invention.

FIG. 5 is an illustration of the DSP-FIFO interface similar to block diagram of FIG. 1 as modified to incorporate the added signals ENDFRM 416 and $\overline{\text{ADV}}$ 426. These signals are needed to incorporate the functionality described to provide flexible control over the frame transfer operation. Statically setting the signal $\overline{\text{ADV}}$ 426 to an active low state changes the timing on the signal 511 to conform to the timing of $\overline{\text{ADVPAF}}$ 422. $\overline{\text{ADVPAF}}$ signal 511 supplies INTx input 509 of external bus 100. Similarly, for a digital signal processor performing write bursts to a FIFO 102 the identical signals ENDFRM 416 and $\overline{\text{ADV}}$ 426 allow the digital signal processor write FIFO 102 to generate an analogous signal $\overline{\text{ADVPAE}}$ 512 for write burst operation. $\overline{\text{ADVPAE}}$ signal 512 supplies INTy input 510 of external bus 100.

Figure 6:
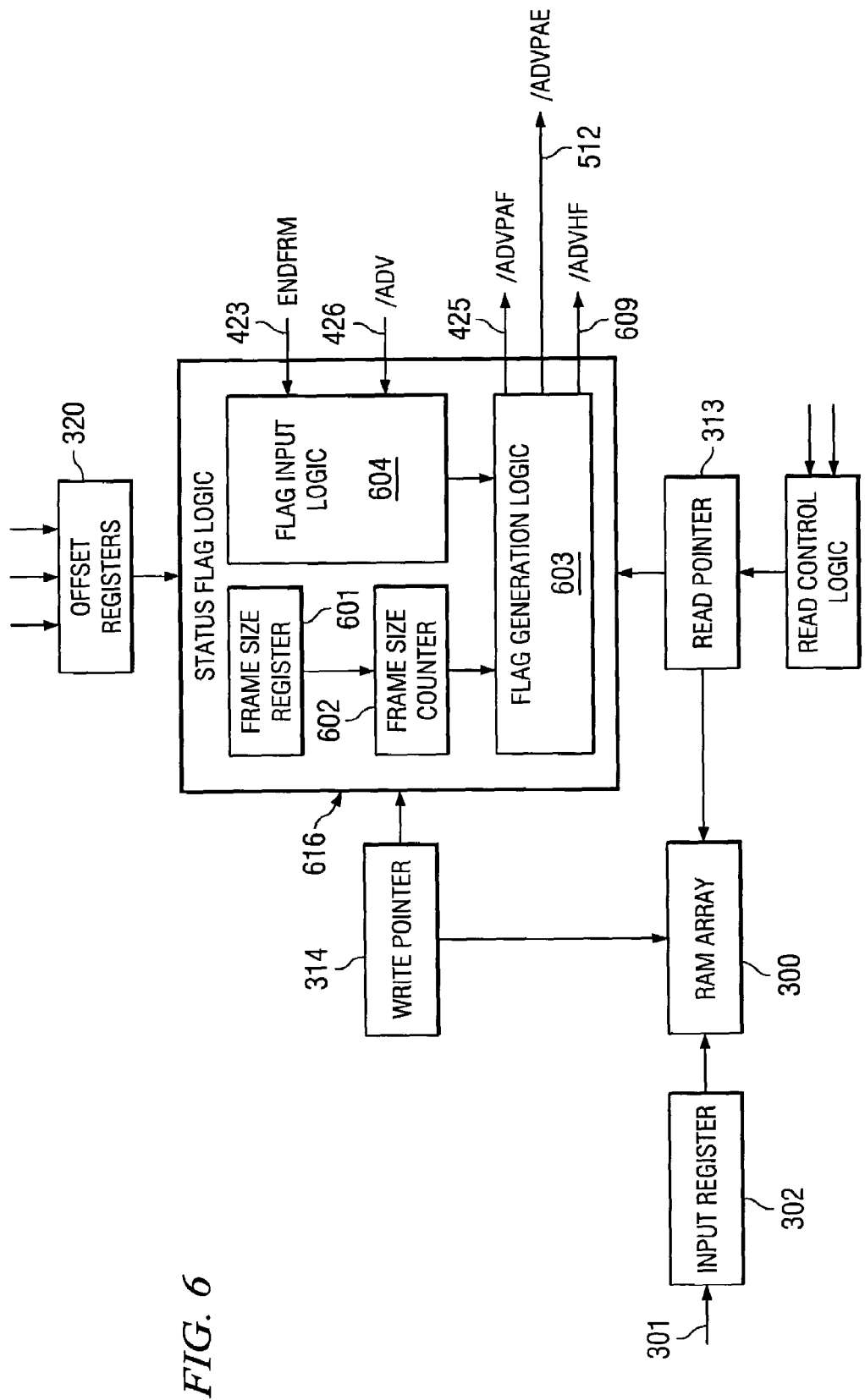
FIG. 6 illustrates the block diagram of the status flag logic block and input output signals to the modified synchronous FIFO function of this invention.

FIG. 6 illustrates the status flag logic a portion of the FIFO block diagram (316 of FIG. 3), showing the additional signals ENDFRM 416 and $\overline{\text{ADV}}$ 426 input to the status flag logic block 616. Four blocks internal to the status flag logic are illustrated. The frame size register 601 holds the value of the frame size programmed into the FIFO during the reset operation. When the FIFO operates from the programmed frame size value the frame size counter 602 is used to count words transferred during a frame. The flag generation logic 603 keys off the completion cycle in the frame size counter 602 and the inputs from the flag input logic 604 to generate the flags $\overline{\text{ADVPAF}}$ 425, $\overline{\text{ADVPAE}}$ 512, and $\overline{\text{ADVHF}}$ 609. This option, the second embodiment of the invention allows for the digital signal processor to program the FIFO during the reset cycle passing the frame size and word count information to the FIFO via the offset registers 320. This allows the FIFO to generate on command the modified flag signals signal on its own without the otherwise required ENDFRM 416 and $\overline{\text{ADV}}$ 426 input signals.

What is claimed is:

1. A method of transferring bursts of data between a processor device and a FIFO device, said transfer comprising:
   triggering a burst transfer at the processor from a change of state of a FIFO output signal by the FIFO device, said change of state being an occurrence of a triggering event within the FIFO device; and
   inhibiting the FIFO device from changing state of the FIFO output signal thereby inhibiting of triggering of any further burst transfers until a current burst transfer is complete including the processor device supplying to the FIFO device an end of burst signal upon completion of the burst transfer, and inhibiting the FIFO device from changing state of the FIFO output signal until receipt of said end of burst signal.

2. The method of claim 1, wherein:

said triggering event is change in a FIFO fullness indicator flag.

3. The method of claim 2, wherein:

said FIFO fullness indicator flag denotes the FIFO is less than or greater than half full; and said triggering event is changing from said FIFO fullness indicator flag denoting less than half full to greater than half full.

4. The method of claim 2, wherein:

said fullness indicator denotes less than or greater than half full; and said triggering event is changing from said FIFO fullness indicator flag denoting greater than half full to less than half full.

5. The method of claim 1, wherein:

said burst transfer includes transfer of predetermined amount of data in fixed number of sequential clock cycles.

6. A method of transferring bursts of data between a processor device and a FIFO device, said transfer comprising:

triggering a burst transfer at the processor from a change of state of a FIFO output signal by the FIFO device, said change of state being an occurrence of a triggering event within the FIFO device; and inhibiting the FIFO device from changing state of the FIFO output signal thereby inhibiting further burst transfers until a current burst transfer is complete including the FIFO device counting a predetermined number of cycles corresponding to a burst transfer size, and inhibiting the FIFO device from changing state of the FIFO output signal until completion of counting the predetermined number of cycles.

7. The method of claim 6, wherein:

said triggering event is change in a FIFO fullness indicator flag.

8. The method of claim 7, wherein:

said FIFO fullness indicator flag denotes the FIFO is less than or greater than half full; and said triggering event is changing from said FIFO fullness indicator flag denoting less than half full to greater than half full.

9. The method of claim 7, wherein:

said fullness indicator denotes less than or greater than half full; and said triggering event is changing from said FIFO fullness indicator flag denoting greater than half full to less than half full.

10. The method of claim 6, wherein:

said burst transfer includes transfer of predetermined amount of data in fixed number of sequential clock cycles.

* * * * *